United States Patent
Smidt et al.

(10) Patent No.: US 6,757,182 B2
(45) Date of Patent: Jun. 29, 2004

(54) POWER SUPPLY SYSTEM WITH SECONDARY CONTROL CIRCUITRY PROVIDING POWER-BASED FEEDBACK

(75) Inventors: Pieter Jan Mark Smidt, Eindhoven (NL); Robert Eduard Fransiscus Einerhand, Eindhoven (NL); Fatmir Ribari, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/253,233

(22) Filed: Sep. 24, 2002

(65) Prior Publication Data

US 2003/0058661 A1 Mar. 27, 2003

(30) Foreign Application Priority Data

Sep. 26, 2001 (EP) .............................................. 01203675

(51) Int. Cl.$^7$ ............................................. H02M 3/335
(52) U.S. Cl. ................. 363/21.14; 363/21.13; 363/178
(58) Field of Search .......................... 363/21.06, 21.14, 363/21.13, 21.05, 89, 178

(56) References Cited

U.S. PATENT DOCUMENTS

| | | | |
|---|---|---|---|
| 3,986,097 A | * 10/1976 | Woods | ......................... 363/22 |
| 4,600,984 A | 7/1986 | Cohen | .......................... 363/97 |
| 5,745,351 A | * 4/1998 | Taurand | ........................ 363/20 |
| 5,859,524 A | 1/1999 | Ettes | ........................... 320/132 |
| 6,069,804 A | * 5/2000 | Ingman et al. | ............ 363/21.14 |
| 6,594,161 B2 | * 7/2003 | Jansen et al. | ............. 363/21.14 |

FOREIGN PATENT DOCUMENTS

| | | | |
|---|---|---|---|
| AT | 388064 B | 4/1989 | ............ H02M/3/04 |
| AT | 399432 B | 5/1995 | ........... H02M/5/293 |

* cited by examiner

*Primary Examiner*—Shawn Riley

(57) ABSTRACT

According to one example embodiment, a power-supply system describing a bi-directional flyback topology includes two flyback converters working in opposite directions. Current flowing from a power supply unit to an apparatus is converted from a mains input in the power supply unit to a rectified output current fed to the apparatus via a two-lead cable. In the opposite direction, a secondary control circuit, situated in the apparatus, including a secondary switch causes excess current to be fed back to the power-supply unit where primary control circuitry reacts to stabilize the current fed to the apparatus. The primary control circuitry serves to minimize the amount of energy received from the feedback. The excess current in the apparatus is determined by monitoring the voltage and the current in the apparatus is load. If the measured parameters are too high, transfer of more energy back to the power-supply unit will be performed.

10 Claims, 1 Drawing Sheet

Figure 1:
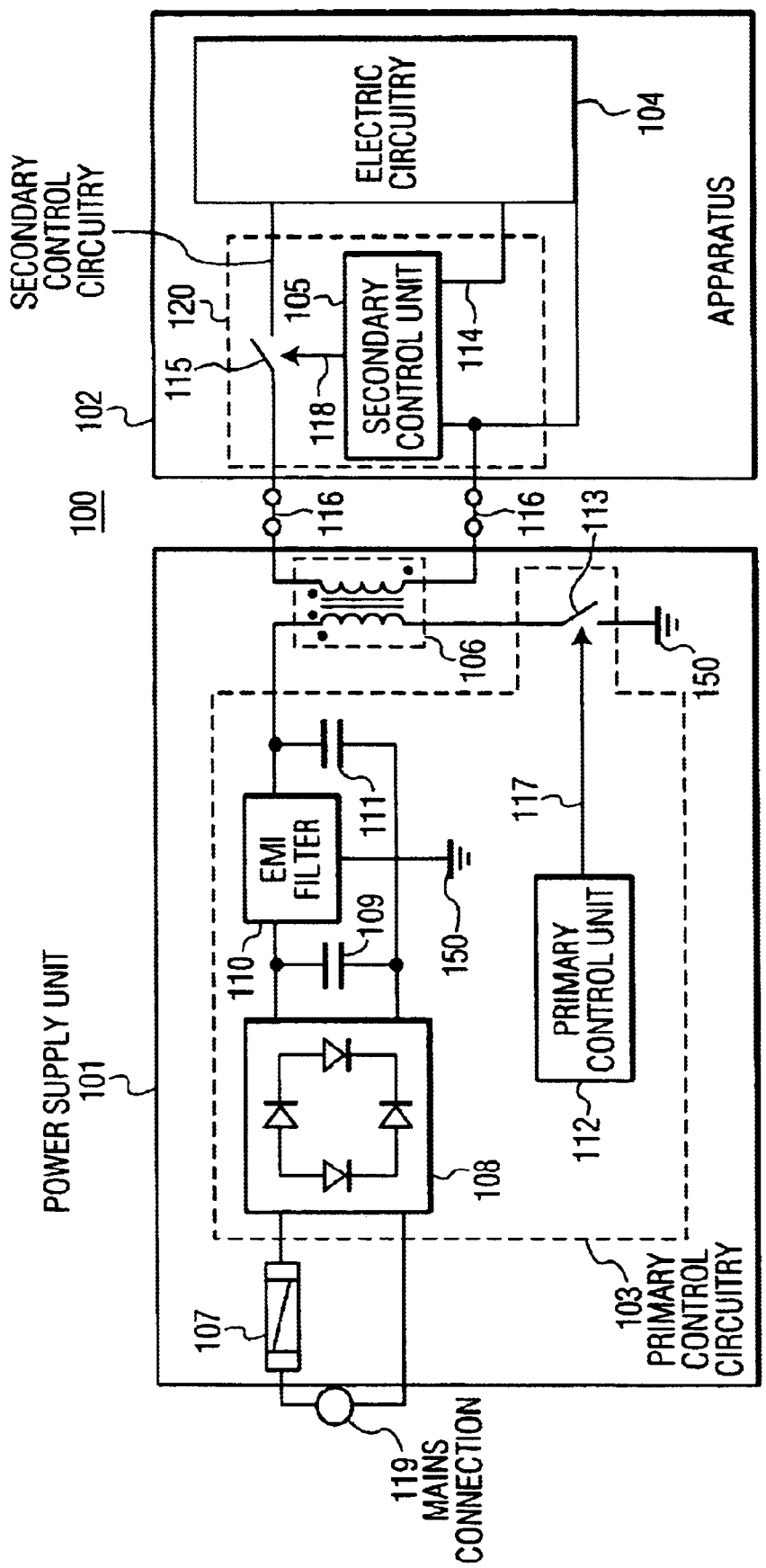

POWER SUPPLY SYSTEM WITH SECONDARY CONTROL CIRCUITRY PROVIDING POWER-BASED FEEDBACK

The present invention relates to a power supply system arranged to supply electric power to an apparatus, said system including a power supply unit comprising primary control circuitry arranged to control power flow to the apparatus via a two-lead cable. Furthermore, the invention relates to a power supply unit and an apparatus arranged to supply and receive power respectively.

Present-day switch-mode power-supply units (SMPS) for battery-enabled electronic equipment, such as tools, shavers, portable computers and mobile communication terminals, usually comprise a number of components, including vital parts such as a connection to a mains outlet, a control circuit for controlling the electric current output to the equipment connected, a transformer and a connection to the electronic equipment.

In most electronic equipment a number of provisions, realized in more or less specific electronic circuitry, are necessary to guarantee functionality for a variety of environmental conditions as well as the safety and protection of electronic components in the equipment. However, these provisions are at least in part a duplication of the control circuitry already present in the power-supply unit.

In order to secure the function of the equipment while providing power from a power-supply unit according to the prior art under varying conditions, it is necessary to provide information relating to the function of the equipment to the power-supply control circuitry. Such information may, e.g., relate to the charging level of a battery in the equipment or any other parameter, representing a condition in the equipment, which requires a change in, e.g., the level of current supplied by the power-supply unit. This feedback information is usually provided from the equipment to the power-supply unit via electronic circuitry inside the equipment as well as a dedicated information communication lead in the form of a galvanic or non-galvanic connection. Processing of the information fed back from the equipment is taken care of in the control circuitry of the power-supply unit. Needless to say, this entails adding to the complexity of the control circuitry.

In some cases, such as in the case of the apparatus disclosed in U.S. Pat. No. 5,859,524, the information relating to conditions in the equipment is fed back to the power-supply unit via the two-lead connection used for supplying the power. However, the information feedback is performed during temporary breaks in the supply of power. That is, the power supply from the power-supply unit of U.S. Pat. No. 5,859,524 to the equipment is regularly interrupted, during which breaks information is fed back to the control circuitry of the power-supply unit.

Drawbacks related to prior art power-supply systems hence include the high complexity of the control circuitry in the power-supply unit as well as the necessity of interrupting the flow of current, and thus reducing the efficiency, when information is to be fed back from the equipment to the power-supply unit.

An object of the invention is to overcome the drawbacks related to prior art power supplies as discussed above. This object is achieved in an inventive manner in the appended claims.

According to a first aspect, the invention relates to a power supply system arranged to supply electric power to an apparatus. The system includes a power supply unit comprising primary control circuitry arranged to control the power flow to the apparatus via a two-lead cable. The system further comprises secondary control circuitry located in the apparatus, said secondary control circuitry being arranged to monitor usage of power received from the power supply unit and feedback excess energy to the power supply unit via the two-lead cable.

In other words, the invention according to the first aspect provides a system describing a bi-directional flyback topology comprising two flyback converters working in opposite directions. Energy packets, i.e. current, flowing from the power supply unit to the apparatus is converted from a mains input in the power supply unit to a rectified output current fed to the apparatus via the two-lead cable. In the opposite direction, the secondary control circuit in the apparatus causes excess current to be fed back to the power-supply unit, where the primary control circuitry reacts in order to stabilize the current fed to the apparatus. In fact, the primary control circuitry serves to minimize the amount of energy received from the feedback. The excess current in the apparatus is determined by monitoring the voltage across, and current through, the apparatus is load. If the measured parameters are too high, transfer of more energy back to the power-supply unit will be performed.

The invention is based on the recognition that it is particularly advantageous to locate the secondary control circuitry in the apparatus and in fact combine it with circuitry already present in the apparatus. A system according to the invention can hence be described in terms of a split topology system. Unnecessary duplication of control circuitry related to supply of power from a power-supply unit is avoided, thereby reducing the complexity and cost of the manufacturing process.

Another advantage is that the feedback from the apparatus to the power-supply is simplified since a third information lead, e.g. an optocoupler, can be avoided.

In a preferred embodiment, the secondary control circuitry comprises a switch connected in series with the two-lead connection. The switch is controlled to open and close in dependence upon the measured values of voltage and current in the apparatus. For the switch use is preferably made of a reverse-biased field effect transistor, i.e. utilized by applying a reverse bias voltage across the body diode of the transistor.

By working continuously in a bi-directional flyback manner, the power-supply unit sends energy packets to the apparatus and the apparatus returns excess energy to the power-supply. This occurs during each cycle of the flyback conversion. In view of this, another advantage of the invention resides in that it allows a continuous supply of power from the power supply, without any interruptions for signaling, as is the case in prior art devices.

According to a second aspect of the invention, a power supply unit is provided, which is arranged to supply electric power to an apparatus. The power supply unit comprises primary control circuitry arranged to control the power flow to the apparatus via a two-lead cable, receive feedback current via the two-lead cable from the apparatus and control the power flow to the apparatus in response to the feedback current.

Advantages obtained by providing a power-supply unit according to the second aspect of the invention are apparent from the discussion above in connection with a power supply system.

According to a third aspect of the invention, an apparatus is provided, which is arranged to receive power from a power supply via a two-lead cable. The apparatus comprises secondary control circuitry, which is arranged to monitor usage of power received from the power supply unit and feedback excess energy to the power supply unit via the two-lead cable.

Advantages obtained by providing a power-supply unit according to the second aspect of the invention are apparent from the discussion above in connection with a power supply system.

These and other aspects of the invention will be apparent from and elucidated with reference to the embodiments described hereinafter FIG. 1 schematically shows a block diagram of a system, a power supply unit and an apparatus according to the invention.

A block diagram of a power supply system 100 is shown in FIG. 1. The system 100 includes a primary side comprising a power supply unit 101 and a secondary side comprising an apparatus 102 connected to the power supply unit 101 via a two-lead cable 116. The power supply unit 101 comprises a primary control circuit 103, a transformer 106 as well as a mains connection 119 and a fuse 107. The primary control circuit 103 includes a rectifier 108, capacitors 109,111 and an EMI filter 110. Moreover, the primary control circuit 103 includes a primary switch 113 controlled by a primary control unit 112 via a control lead 117.

The apparatus 102 comprises electric circuitry 104 and a secondary control circuit 120. The apparatus 102 may be any kind of apparatus needing a separate power supply unit, such as an electric shaver, a mobile telephone or a portable computer, and hence includes a rechargeable battery and other circuitry for performing the specific function of the apparatus.

The secondary control circuit 120 includes a secondary control unit 105, a secondary switch 115 controlled by the secondary control unit 105 via a secondary control lead 118. The secondary control unit 105 is capable of measuring, via a sensing lead 114, the electric conditions within the electric circuitry 104 of the apparatus 102 and control the secondary switch 115 in dependence on the measured conditions in the circuitry 104. For example, by measuring a voltage and current in the electric circuitry 104, the excess of energy circulating in the circuitry 104 is determined. If the measured voltage and current are too high, the secondary control unit 105 controlling the secondary switch 115 will cause said switch to be closed, i.e. switched on, resulting in transfer of more energy back to the power supply unit 101.

The interworking of the circuitry of the power supply unit 101 and the apparatus 102 will now be described in more detail.

A rectified DC voltage is available at an input of the transformer 106. The primary switch 113, which is controlled by the primary control circuit 112, transfers energy packages from the primary to the secondary side, i.e. from the power supply 101 to the apparatus 102, through the transformer 106 and the two lead cable 116.

In dependence on information obtained by measuring the electric conditions in the circuitry 104 of the apparatus, the secondary control unit 105 controls the secondary switch 115. In a preferred embodiment, the secondary switch 115 is a field effect transistor, e.g. MOSFET, which has two functions. First, when the switch 115 is switched ON, i.e. when its body diode is forward biased (minimum voltage across the switch), the switch 115 acts as a synchronous rectifier resulting in a high rectification efficiency.

Secondly, by using the MOSFET switch in a reverse direction, any excess energy circulating on the secondary side, i.e. in the circuitry 104 of the apparatus 102, will be returned to the power supply 101.

The secondary side sends back, through the transformer 106, excess energy received from the primary side. The output voltage or current of the power supply unit 101 is thus stabilized and the losses in the system are minimized.

The operation of primary control unit 112 and secondary control unit 105 will now be explained. Initially, the primary control circuit 112 closes the primary switch 113 and a linearly increasing current flows in the primary winding of transformer 106, storing energy in its magnetic core. Sensing and controlling is performed by the secondary control unit 105 and at a peak current level, the primary switch 113 is turned off and current is transferred into the secondary winding of transformer 106 by the flyback action. The secondary switch 115 includes a parallel-connected internal body diode (not shown), which is connected with polarity, as for a conventional flyback converter, so as to become conductive when the primary switch 113 is turned off.

By measuring the voltage across the secondary switch 115, it is possible to detect when its body diode is conducting current into the secondary side circuitry 104. Under this condition, the secondary switch 115 is immediately turned on. As a result, current is transferred from the body diode to the MOSFET, which is selected so as to have a voltage drop substantially lower than the body diode. In this way a reduction in the conduction losses of the secondary rectifier can be obtained.

When the primary switch 113 is turned off, i.e. opened, a linearly decreasing current flows through the secondary switch 115, the current resulting from energy stored in the magnetic core of transformer 106 and being delivered to a reservoir capacitor in the secondary side circuitry 104 at a substantially constant voltage. When the secondary current reaches zero it reverses and starts increasing in the negative polarity. Now energy is transferred from the secondary reservoir capacitor back into the core of transformer 106. By contrast, in comparison with previous flyback converters with diode rectification, when a current through a secondary switch reaches zero, the rectifier diode becomes reverse biased and hence the energy has been delivered to the secondary side and current ceases to flow.

By means of the secondary control unit 105, the voltage and/or current in the secondary circuitry 104 are continuously compared with a stable reference source. A DC error voltage is generated from this comparison, which determines the amount of energy to be returned to the primary winding of the transformer 106. A larger error voltage will result in the negative current ramp increasing to a greater degree before the secondary switch 115 is turned off. Thus, more energy is transferred back to the core of the transformer 106.

When the secondary switch 115 is turned off, flyback action occurs in the transformer 106 and a body diode inside the primary switch 113, connected in anti-parallel polarity with the primary switch 113, becomes conductive. The transformer 106 has magnetizing inductance and interwinding capacitance. Energy stored in the magnetizing inductance resonates with the inter-winding capacitance and generates a sinusoidal voltage on the transformer windings. The amplitude of this voltage is a measure of how much energy is returned from the apparatus 102 to the power supply 101. In order to regulate the amount of excess energy circulating in the system and thus maximize efficiency, the amplitude of the sinusoidal voltage is measured, by means of the primary control unit 112, and used inversely to control the peak primary current level at which the primary switch 113 is turned off, so that the power flow through the system ceases.

In broad outline, the secondary control circuit 105 controls current and/or voltage delivered to the circuitry 104 of the apparatus 102 by taking only the exact amount of energy needed and returning excess energy to the power supply unit 101. The primary control circuit 112 regulates, to a small fixed level, the amount of energy that the circuitry in the apparatus 102 must return.

Summarizing the above in more detail, a power-supply system describing a bi-directional flyback topology comprises two flyback converters working in opposite directions. Current flowing from a power supply unit (101) to an apparatus (102) is converted from a mains input (119) in the power supply unit to a rectified output current fed to the apparatus via a two-lead cable (116). In the opposite direction, a secondary control circuit (120), located in the apparatus, comprising a secondary switch (115) causes excess current to be fed back to the power-supply unit where primary control circuitry (103) reacts to stabilize the current fed to the apparatus. The primary control circuitry serves to minimize the amount of energy received from the feedback. The excess current in the apparatus is determined by monitoring the voltage and the current in the apparatus is load. If the measured parameters are too high transfer of more energy back to the power-supply unit will be performed.

What is claimed is:

1. Power supply system including a power supply unit and an apparatus, said power supply unit comprising primary control circuitry arranged to control the energy flow to the apparatus via a two-lead cable, characterized in that the system further comprises secondary control circuitry located in the apparatus, said secondary control circuitry being arranged to monitor usage of energy received from the power supply unit and feedback excess energy to the power supply unit via the two-lead cable.

2. Power supply system comprising:
   a power supply unit and an apparatus, said power supply unit including primary control circuitry arranged to control the energy flow to the apparatus via a two-lead cable; and
   secondary control circuitry located in the apparatus and being arranged to monitor usage of energy received from the power supply unit and to feed back excess energy to the power supply unit via the two-lead cable, the secondary control circuitry including a switch acting as a synchronous rectifier feeding back current to the power supply unit.

3. Power supply system according to claim 2, wherein the switch is in the form of a field effect transistor.

4. Power supply unit arranged to supply electric energy to an apparatus, said power supply unit comprising primary control circuitry arranged to control the energy flow to the apparatus via a two-lead cable, characterized in that the primary control circuitry is arranged to receive feedback energy via the two-lead cable from the apparatus and control the energy flow to the apparatus in response to the feedback energy.

5. An apparatus arranged to receive energy from a power supply unit via a two-lead cable, characterized in that the apparatus comprises secondary control circuitry, said secondary control circuitry being arranged to monitor usage of energy received from the power supply unit and feedback excess energy to the power supply unit via the two-lead cable.

6. An apparatus arranged to receive energy from a power supply unit via a two-lead cable, wherein the apparatus comprises secondary control circuitry, said secondary control circuitry being arranged to monitor usage of energy received from the power supply unit and feedback excess energy to the power supply unit via the two-lead cable and including a switch acting as a synchronous rectifier feeding back current to the power supply unit.

7. An apparatus according to claim 6, wherein the switch is in the form of a field effect transistor.

8. A power supply system comprising:
   a power supply unit and an apparatus, said power supply unit including primary control circuitry arranged to control the energy flow to the apparatus via a multi-lead cable, and
   secondary control circuitry located in the apparatus, said secondary control circuitry including a switch and being arranged to monitor usage of energy received from the power supply unit and in response to the monitored usage of energy, controlling the switch to provide feedback current to the power supply unit via the multi-lead cable.

9. The power supply system of claim 8, wherein the feedback current is determined by the secondary control circuitry to be excess current.

10. The power supply system of claim 8, wherein the switch includes a field effect transistor.

\* \* \* \* \*